United States Patent
Neissl et al.

(10) Patent No.: US 9,487,634 B2
(45) Date of Patent: Nov. 8, 2016

(54) HIGH ISOTACTIC PP RESIN WITH WIDE MELTING DISTRIBUTION HAVING IMPROVED BOPP FILM PROPERTIES AND EASY PROCESSING CHARACTERISTICS

(71) Applicant: Borealis AG, Vienna (AT)

(72) Inventors: Wolfgang Neissl, Lichtenberg (AT); Dietrich Gloger, Linz (AT); Gregory Potter, Linz (AT); Davide Tranchida, Linz (AT)

(73) Assignee: Borealis AG (AT)

( * ) Notice: Subject to any disclaimer, the term of this patent is extended or adjusted under 35 U.S.C. 154(b) by 0 days.

(21) Appl. No.: 14/440,844

(22) PCT Filed: Nov. 6, 2013

(86) PCT No.: PCT/EP2013/073175
§ 371 (c)(1),
(2) Date: May 5, 2015

(87) PCT Pub. No.: WO2014/075971
PCT Pub. Date: May 22, 2014

(65) Prior Publication Data
US 2015/0267014 A1    Sep. 24, 2015

(30) Foreign Application Priority Data
Nov. 16, 2012  (EP) .................................... 12193044

(51) Int. Cl.
| | | |
|---|---|---|
| *C08F 110/06* | (2006.01) | |
| *C08J 5/18* | (2006.01) | |
| *H01G 4/18* | (2006.01) | |
| *B29C 55/00* | (2006.01) | |
| *B29K 23/00* | (2006.01) | |

(52) U.S. Cl.
CPC ............... *C08J 5/18* (2013.01); *B29C 55/005* (2013.01); *H01G 4/18* (2013.01); *B29K 2023/12* (2013.01); *C08F 110/06* (2013.01); *C08J 2323/12* (2013.01)

(58) Field of Classification Search
CPC ......... C08F 110/06; C08J 5/18; C08L 23/12; C08L 2203/16
See application file for complete search history.

(56) References Cited

U.S. PATENT DOCUMENTS

2002/0173602 A1   11/2002   Appleyard et al.

FOREIGN PATENT DOCUMENTS

| CN | 11547374 A | 7/1997 |
| EP | 0776926 A2 | 6/1997 |
| EP | 0945472 A2 | 9/1999 |
| EP | 2410539 A1 | 1/2012 |
| WO | 9955518 A1 | 11/1999 |
| WO | 2010107052 A1 | 9/2010 |
| WO | WO 2011/080153 A1 * | 7/2011 ............ C08F 110/06 |
| WO | 2012016964 A1 | 2/2012 |

OTHER PUBLICATIONS

European Search Report EP12193044, Nov. 6, 2103.
Zhe Zhou, et al. "A new decoupling method for accurate quantification of polyethylene copolymer composition and triad sequence distribution with 13C NMR", Journal of Magnetic Resonance 187 (2007) 225-233.
Luigi Resconi, et al. "Selectivity in Propene Polymerization with Metallocene Catalysts", Chem. Rev. 2000, 100, 1253-1345.
A. Turner Jones, et al. "Crystalline Forms of Isotactic Polypropylene", Imperial Chemical Industries Limited, Welwyn Garden City, Herts., England Eingegangen am Oct. 8, 1963.
Gurmeet Singh, et al. "Triad sequence determination of ethylene-propylene copolymers—application of quantitative 13C NMR", Polymer Testing 28 (2009) 475-479.
Wen-Jun Wang, et al. "Structural Analysis of Ethylene/Propylene Copolymers Synthesized with a Constrained Geometry Catalyst", Macromolecules 2000, 33, 1157-1162.
James C. Randall "A Review of High Resolution Liquid 13Carbon Nuclear Magnetic Resonance Characterizations of Ethylene-Based Polymers", JMS-Rev. Macromol. Chem. Phys. C29 (2 &3), 201-317 (1989).
Martin Obadal, et al. "Tailoring of Three-Phase Crystalline Systems in Isotactic Poly(propylene)", Macromol. Rapid Commun. 2005, 26, 1253-1257.
Masahiro Kakugo, et al. "13C NMR Determination of Monomer Sequence Distribution in Ethylene-Propylene Copolymers Prepared with 6-TiC13-Al( C2H5%) Cl", Macromolecules 1982, 15, 1150-1152.
H.N. Cheng "13C NMR Analysis of Ethylene-Propylene Rubbers", Macromolecules 1984, 17, 1950-1955.
K. D. Pae, Rutgers "Solid-Solid Transition of Isotactic Polypropylene", Journal of Polymer Science: Part A-s vol. 6, 657-663 (1968).
Vincenzo Busico, et al. "Microstructure of polypropylene", Prog. Polym. Sci. 26 (2001) 443-533.
Vincenzo Busico, et al. "Alk-1-ene Polymerization in the Presence of a Monocyclopentadienyl Zirconium(IV) Acetamidinate Catalyst: Microstructural and Mechanistic Insights", Macromol. Rapid Commun. 2007, 28, 1128-1134.
Vincenzo Busico, et al. "Full Assignment of the 13C NMR Spectra of Regioregular Polypropylenes: Methyl and Methylene Region", Macromolecules 1997, 30, 6251-6263.
Office action for Chinese patent application No. 201380057901.5 dated Feb. 29, 2016.
Japanese Office Action dated Nov. 24, 2015.

* cited by examiner

*Primary Examiner* — Rip A Lee
(74) *Attorney, Agent, or Firm* — Tarolli, Sundheim, Covell & Tummino LLP

(57) ABSTRACT

The present invention relates to a new biaxially oriented polypropylene (BOPP) film, a process for the preparation of such film as well as the use of a polypropylene for the preparation of such film and an article comprising such film.

11 Claims, No Drawings

HIGH ISOTACTIC PP RESIN WITH WIDE MELTING DISTRIBUTION HAVING IMPROVED BOPP FILM PROPERTIES AND EASY PROCESSING CHARACTERISTICS

The present invention relates to a new biaxially oriented polypropylene (BOPP) film, a process for the preparation of such film as well as the use of a polypropylene for the preparation of such film and an article comprising such film.

Biaxially oriented polypropylene (BOPP) films, also known as oriented polypropylene films, are used in a wide variety of technical applications such as packaging, tapes or capacitor films. Desired properties of these polypropylene films are high stiffness and crystallinity in combination with low shrinkage and good mechanical properties such as high elastic modulus. At the same time, the polypropylene films should have beneficial processing properties. In particular, it is of interest to have low yield forces in biaxial orientation while still obtaining polypropylene films with high draw ratios and no film breaking. However, any improvement in processability behaviour should not be achieved at the expense of film properties. The base resin used for preparing such oriented polypropylene films is usually a polypropylene of intermediate to high isotacticity in combination with a low amount of xylene cold solubles (XCS) and a narrow melting distribution. The latter has long been believed to affect the forces required for the biaxial deformation during processing and/or to control the processing window in terms of minimum and maximum temperature that can be used to carry out the biaxial orientation and thus is responsible for the stretchability of the biaxially oriented polypropylene (BOPP) film. However, the properties with regard to stiffness, crystallinity and shrinkage of such oriented polypropylene films are quite good but the required yield forces in biaxial orientation are relatively high.

Thus, there is still a need in the art for providing a biaxially oriented polypropylene film which avoids the foregoing disadvantages and especially allows for improving the processability properties of such a film and the resulting film properties. In other words, it would be desirable to provide a biaxially oriented polypropylene film which is easy to process and wherein the resulting biaxially oriented polypropylene film features favourable film properties compared to prior art biaxially oriented polypropylene films.

Accordingly, it is an object of the present invention to provide a biaxially oriented polypropylene film having an improved balance between film properties and processing properties. In particular, the film should have low shrinkage and high crystallinity while being obtainable at low yield forces in biaxial orientation.

The present invention is based on the finding that a biaxially oriented polypropylene film providing good film properties such as low shrinkage and high crystallinity in combination with exceptional processing properties such as low yield forces in biaxial orientation can be accomplished by a polypropylene having a low amount of residual crystallinity $f_{RC}$.

Accordingly, the present invention is directed in a first aspect to a biaxially oriented polypropylene (BOPP) film, wherein the biaxially oriented polypropylene (BOPP) film comprises a polypropylene (PP) having a residual crystallinity $f_{RC}$ of ≤0.40 at a temperature (T) being 1° C. below the melting temperature $(T_m)$ of the unstretched polypropylene (PP) [T=Tm−1].

In one embodiment of the present invention, the biaxially oriented polypropylene (BOPP) film of the first aspect comprises a polypropylene (PP) having a residual crystallinity $f_{RC}$ of from 0.10 to 0.40 at a temperature (T) being 1° C. below the melting temperature $(T_m)$ of the polypropylene (PP), preferably of the compression molded specimen of the polypropylene (PP), [T=Tm−1].

In another embodiment of the present invention, the biaxially oriented polypropylene (BOPP) film of the first aspect comprises a polypropylene (PP) having a residual crystallinity $f_{RC}$ of ≤0.35 at the melting temperature $(T_m)$ of the polypropylene (PP), preferably of the compression molded specimen of the polypropylene (PP).

Alternatively, the present invention is directed in a second aspect to a biaxially oriented polypropylene (BOPP) film comprising a polypropylene (PP), wherein said polypropylene (PP) has
(a) a crystallinity of >61.5%,
and
(b) a shrinkage of <2.2%,
when drawn at a draw ratio in machine direction and in transverse direction of 5.0 and a drawing temperature $(T_{draw})$ being 1° C. below the melting temperature $(T_m)$ of the polypropylene (PP) $[T_{draw}=T_m-1]$.

In one embodiment of the second aspect of the present invention, the polypropylene (PP) of the biaxially oriented polypropylene (BOPP) has
(a) a crystallinity of ≥62.0%, preferably of from 62.0 to 70.0%,
and/or
(b) a shrinkage of ≤2.1%, preferably of from 0.5 to 2.0%, when drawn at a draw ratio in machine direction and in transverse direction of 5.0 and a drawing temperature $(T_{draw})$ being 1° C. below the melting temperature $(T_m)$ of the polypropylene (PP) $[T_{draw}=Tm-1]$.

In one embodiment of the present invention, the biaxially oriented polypropylene (BOPP) film of the first and/or second aspect comprises a polypropylene (PP) comprising
(a) crystalline fractions crystallizing in the temperature range of
  (i) above 150 to 160° C.
  (ii) above 160 to 170° C.,
  wherein the amount of the two crystalline fractions [wt.-%] differs from each other of more than 10.0 wt.-%, wherein further said fractions are determined by the stepwise isothermal segregation technique (SIST),
and/or
(b) crystalline fractions crystallizing in the temperature range of
  (i) above 160 to 170° C.
  (ii) above 170 to 180° C.,
  wherein the amount of the two crystalline fractions [wt.-%] differs from each other of not more than 7.0 wt.-%, wherein further said fractions are determined by the stepwise isothermal segregation technique (SIST),
and/or
(c) crystalline fractions crystallizing above 160° C. of more than 63.0 wt.-%, wherein said fractions are determined by the stepwise isothermal segregation technique (SIST).

In another embodiment of the present invention, the biaxially oriented polypropylene (BOPP) film of the first and/or second aspect comprises a polypropylene (PP) comprising
(a) crystalline fractions crystallizing in the temperature range of below 120° C. in an amount of not more than 1.0 wt.-%,
and/or (b) crystalline fractions crystallizing in the temperature range of below 150° C. in an amount of not more than 15.0 wt.-%,
and/or
(c) crystalline fractions crystallizing above 180° C. in an amount of not more than 1.0 wt.-%, wherein said fractions are determined by the stepwise isothermal segregation technique (SIST).

In yet another embodiment of the present invention, the biaxially oriented polypropylene (BOPP) film of the first and/or second aspect comprises a polypropylene (PP) having
(a) a melting temperature ($T_m$) measured by differential scanning calorimetry (DSC) of at least 162° C., preferably of at least 164° C.,
and/or
(b) a crystallization temperature ($T_c$) measured by differential scanning calorimetry (DSC) of at least 115° C., preferably of at least 118° C.

In one embodiment of the present invention, the biaxially oriented polypropylene (BOPP) film of the first and/or second aspect comprises a polypropylene (PP) having
(a) a melt flow rate $MFR_2$ (230° C.) measured according to ISO 1133 of ≤7.0 g/10 min, preferably of ≤5.0 g/10 min,
and/or
(b) a xylene cold soluble fraction (XCS) determined at 23° C. according ISO 6427 of ≥2.0 wt.-%, preferably in the range of from 2.0 to 3.0 wt.-%,
and/or
(c) an mmmm pentad concentration of ≥95.0 mol-%, preferably in the range of from 95.0 to 98.0 mol-% determined by NMR-spectroscopy,
and/or
(d) 2,1 erythro regio-defects of below 1.0%, preferably below 0.5%, more preferably below 0.3% determined by $^{13}$C-NMR spectroscopy.

Wherever in the instant invention the amount of defects, i.e. 2,1 erythro regio-defects and stereo-defects (mmmm pentad), are indicated by "%" the average percentage of propylene units in the polymer chain is meant.

In another embodiment of the present invention, the biaxially oriented polypropylene (BOPP) film of the first and/or second aspect comprises a polypropylene (PP) being a propylene homopolymer (H-PP).

In yet another embodiment of the present invention, the biaxially oriented polypropylene (BOPP) film of the first and/or second aspect has been prepared at a yield force in machine direction of ≤20 N, preferably of ≤15 N.

Surprisingly, it has been found out that such biaxially oriented polypropylene films have superior properties compared to the films known in the art. Especially, the inventive films have exceptional film properties such as low shrinkage and high crystallinity. Moreover and surprisingly the inventive films are obtainable at exceptional processing properties such as low yield forces in biaxial orientation.

It should be understood that for the purposes of the present invention, the following terms have the following meaning:

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

A third aspect of the present invention is directed to a process for the preparation of such a biaxially oriented polypropylene (BOPP) film, the process comprising at least the steps of
(a) providing said polypropylene (PP),
(b) stretching the polypropylene (PP) of step (a) in machine direction and transverse direction, preferably the stretching is accomplished at a temperature which is below the melting temperature ($T_m$) of the polypropylene (PP).

A fourth aspect of the present invention is directed to the use of the polypropylene for the preparation of a biaxially oriented polypropylene (BOPP) film.

A still further aspect of the present invention is directed to an article comprising the biaxially oriented polypropylene (BOPP) film.

When in the following reference is made to preferred embodiments or technical details of the inventive biaxially oriented polypropylene (BOPP) film, it is to be understood that these preferred embodiments and technical details also refer to the inventive process for the preparation of such a biaxially oriented polypropylene (BOPP) film, the inventive use of the polypropylene as well as to the article defined herein and vice versa (as far as applicable). If, for example, it is set out that the polypropylene (PP) of the biaxially oriented polypropylene (BOPP) film has a melting temperature ($T_m$) measured by differential scanning calorimetry (DSC) of at least 164° C., also the polypropylene (PP) of the inventive process, the inventive use as well as the inventive article preferably has a melting temperature ($T_m$) measured by differential scanning calorimetry (DSC) of at least 164° C.

In the following the invention will be described in more detail.

The biaxially oriented polypropylene (BOPP) film according to this invention must comprise the polypropylene (PP) as defined in the instant invention. Accordingly the biaxially oriented polypropylene (BOPP) film preferably comprises at least 80 wt.-%, more preferably comprises at least 95 wt.-%, yet more preferably consists of, the polypropylene (PP). The biaxially oriented polypropylene (BOPP) film may contain additives, like antioxidants and/or calcium stearate, but preferably no other polymer than the polypropylene (PP). Thus, the remaining part up to 100.0 wt.-% may be accomplished by additives known in the art, like antioxidants and/or calcium stearate. Therefore it is preferred that, this remaining part, i.e. the part being not the polypropylene (PP), shall be not more than 5.0 wt.-%, preferably not more than 2.0 wt.-%, like not more than 1.0 wt.-%, within the biaxially oriented polypropylene (BOPP) film. In one preferred embodiment the biaxially oriented polypropylene (BOPP) film contains as polymer component the polypropylene (PP), whereas the remaining part up to 100 wt.-% constitute typical additives but no other polymer.

The term "biaxially oriented polypropylene (BOPP) film" indicates that the film is a biaxially oriented film, i.e. the polypropylene (PP), especially the propylene homopolymer (H-PP), as defined below has been subjected to a stretching process obtaining thereby a biaxially oriented polymer. As indicated above, the biaxially oriented polypropylene (BOPP) film preferably contains the polypropylene (PP), especially the propylene homopolymer (H-PP), as only polymer and thus it is preferably a biaxially oriented polypropylene (BOPP) film made from said polypropylene (PP), especially made from said propylene homopolymer (H-PP).

As the biaxially oriented polypropylene (BOPP) film is preferably prepared from the polypropylene (PP), especially from the propylene homopolymer (H-PP), as defined above, the properties given for the polypropylene (PP), especially from the propylene homopolymer (H-PP), are equally applicable for the biaxially oriented polypropylene (BOPP) film, if not specified differently.

Preferably the biaxially oriented polypropylene (BOPP) film has a stretching ratio of at least 4.0 times, preferably at least 5.0 times, in the machine direction and at least 4.0 times, preferably at least 5.0 times, more preferably at least 8.0 times, like at least 9.0 times in the transverse direction, more preferably has a stretching ratio of at least 5.0 times in the machine direction and at least 9.0 times in the transverse direction, like a stretching ratio of 4.0 to 6.0 or 5.0 to 6.0 times in the machine direction and 9.0 to 10.0 times in the transverse direction.

The polypropylene (PP) of the biaxially oriented polypropylene (BOPP) film is characterized by a low amount of residual crystallinity $f_{RC}$. In particular, the polypropylene (PP) of the biaxially oriented polypropylene (BOPP) film is characterized by a residual crystallinity $f_{RC}$ that is lower than the residual crystallinity $f_{RC}$ measured for a polypropylene of the biaxially oriented polypropylene (BOPP) film known from the prior art.

It is thus preferred that the biaxially oriented polypropylene (BOPP) film comprises a polypropylene (PP) having a residual crystallinity $f_{RC}$ preferably of ≤0.4, more preferably in the range of 0.10 to 0.40, still more preferably in the range of 0.20 to 0.40, yet more preferably in the range of 0.28 to 0.38. The residual crystallinity $f_{RC}$ mentioned in this paragraph has been determined on a compression molded specimen, especially on a compression molded specimen as defined in the example section, of the polypropylene (PP) at a temperature (T) being 1° C. below the melting temperature ($T_m$) of said specimen of the polypropylene (PP) [$T=T_m-1$].

Additionally or alternatively, the biaxially oriented polypropylene (BOPP) film comprises a polypropylene (PP) having a residual crystallinity $f_{RC}$ preferably of ≤0.30, more preferably in the range of more preferably in the range of 0.10 to 0.30, still more preferably in the range of 0.18 to 0.30, yet more preferably in the range of 0.20 to 0.38. The residual crystallinity $f_{RC}$ mentioned in this paragraph has been determined on a compression molded specimen, especially on a compression molded specimen as defined in the example section, of the polypropylene (PP) at the melting temperature ($T_m$) of said specimen of the polypropylene (PP).

The polypropylene (PP) of the biaxially oriented polypropylene (BOPP) film can be further or alternatively defined by its crystallinity and/or shrinkage in the stretched state.

Accordingly it is preferred that the polypropylene (PP) has
(a) a crystallinity of >61.5%, more preferably of >61.5 to 70.0%, still more preferably of 62.0 to 70.0%, yet more preferably of 62.0 to 65.0%
and/or
(b) a shrinkage of <2.2%, more preferably of 0.5 to <2.1%, still more preferably of 0.7 to 2.0%, yet more preferably of 0.8 to 1.7%
when drawn at a draw ratio in machine direction and in transverse direction of 5.0 and a drawing temperature ($T_{draw}$) being 1° C. below the melting temperature ($T_m$) of the polypropylene (PP) [$T_{draw}=T_m-1$]. The precise biaxially stretching of the polypropylene (PP) is defined in the example section.

Additionally or alternatively to the crystallinity and shrinkage of the previous paragraph the polypropylene (PP) has
(a) a crystallinity of >62.0%, more preferably of >62.5 to 70.0%, still more preferably of 63.0 to 70.0%, yet more preferably of 63.0 to 65.0%
and/or
(b) a shrinkage of <3.0%, more preferably of 0.7 to <3.0%, still more preferably of 1.0 to 2.8%, yet more preferably of 1.0 to 2.7%
when drawn at a draw ratio in machine direction and in transverse direction of 5.0 and a drawing temperature ($T_{draw}$) being 3° C. below the melting temperature ($T_m$) of the polypropylene (PP) [$T_{draw}=T_m-3$]. The precise biaxially stretching of the polypropylene (PP) is defined in the example section.

The instant polypropylene (PP) is preferably a random propylene copolymer (C-PP) or a propylene homopolymer (H-PP). In one preferred embodiment of the present invention the polypropylene (PP) is a propylene homopolymer (H-PP).

The expression propylene homopolymer (H-PP) used in the instant invention relates to a polypropylene that consists substantially, i.e. of at least 99.5 wt.-%, based on the total weight of the polypropylene, preferably of at least 99.6 wt.-%, more preferably of at least 99.8 wt.-%, of propylene units. In one embodiment of the present invention, only propylene units in the propylene homopolymer (H-PP) are detectable.

If the polypropylene (PP) is a random polypropylene copolymer (C-PP), it comprises monomers copolymerizable with propylene, i.e. α-olefins other than propylene, for example comonomers such as ethylene and/or $C_4$ to $C_{10}$ α-olefins, in particular ethylene and/or $C_4$ to $C_8$ α-olefins, e.g. 1-butene and/or 1-hexene. Preferably, the random polypropylene copolymer (C-PP) comprises, especially consists of, monomers copolymerizable with propylene from the group consisting of ethylene, 1-butene and 1-hexene. More specifically, the random polypropylene copolymer (C-PP) comprises—apart from propylene—units derivable from ethylene and/or 1-butene. In one embodiment of the present invention, the random polypropylene copolymer (C-PP) comprises units derivable from ethylene and propylene only.

The comonomer content in the random polypropylene copolymer (C-PP) is preferably relatively low, i.e. below 10.0 wt.-% or more preferably equal or below 5.0 wt.-%, based on the total weight of the random polypropylene copolymer (C-PP). In one embodiment of the present invention, the comonomer content is preferably between 0.5 wt.-% and 5.0 wt.-%, more preferably between 0.5 wt.-% and 4.0 wt.-%, even more preferably between 0.5 wt.-% and 3.5 wt.-% and most preferably between 1.0 wt.-% and 3.0 wt.-%, based on the total weight of the random polypropylene copolymer (C-PP).

Preferably, the polypropylene (PP) is isotactic. Accordingly, it is appreciated that the polypropylene (PP) has a rather high pentad concentration (mmmm), i.e. ≥95.0%, determined by NMR-spectroscopy. In one embodiment of the present invention, the polypropylene (PP) has a pentad concentration (mmmm) in the range of from 95.0 to 98.0%, determined by NMR-spectroscopy.

Preferably, the polypropylene (PP) has low amount of regio defects. Accordingly it is preferred that the polypropylene (PP) has 2,1 erythro regio-defects of below 1.0%, preferably below 0.5%, more preferably below 0.3% determined by $^{13}$C-NMR spectroscopy. In one specific embodiments no 2,1-erythro regio-defects are detectable.

It is one characteristic of the instant polypropylene (PP) is its relatively high amounts of xylene cold solubles (XCS), i.e. of ≥2.0 wt.-%, more preferably in the range of 2.1 to 5.0 wt.-%, still more preferably in the range of 2.2 to 4.0 wt.-%. These values are especially applicable for the polypropylene (PP) being a propylene homopolymer (H-PP).

Additionally or alternatively, the polypropylene (PP) has a melt flow rate MFR$_2$ (230° C.) measured according to ISO 1133 of ≤7.0 g/10 min, and preferably of ≤5.0 g/10 min. For example, the polypropylene (PP) has a melt flow rate MFR$_2$ (230° C.) measured according to ISO 1133 in the range of 0.5 to 7.0 g/10 min, preferably in the range of 1.0 to 5.0 g/10 min, and more preferably in the range of 1.5 to 4.0 g/10 min.

Preferably, the polypropylene (PP) is a crystalline polypropylene (PP). The term "crystalline" indicates that the polypropylene (PP), i.e. the propylene homopolymer (H-PP) or the random propylene copolymer (C-PP), has a rather high melting temperature. Accordingly throughout the invention the propylene homopolymer (H-PP) or the random propylene copolymer (C-PP) is regarded as crystalline unless otherwise indicated.

Therefore the polypropylene (PP) has preferably a melting temperature of at least 160° C., i.e. in the range of from 160 to 172° C., more preferably of at least 162° C., i.e. in the range of from 162 to 170° C., more preferably of at least 164° C., i.e. in the range of from 164 to 168° C. or in the range of from 164.0 to 170.0° C. These values are especially applicable for the polypropylene (PP) being a propylene homopolymer (H-PP).

In one embodiment the polypropylene (PP) has a rather high crystallization temperature (T$_c$) as measured by differential scanning calorimetry (DSC). Thus in this embodiment, the polypropylene (PP) has a crystallization temperature (T$_c$) measured by differential scanning calorimetry (DSC) of at least 115° C., preferably of at least 118° C., and more preferably of at least 120° C. Accordingly the polypropylene (PP) has a crystallization temperature (T$_c$) measured by differential scanning calorimetry (DSC) in the range of from 115 to 128° C., preferably in the range of from 118 to 128° C., and more preferably in the range of from 120 to 128° C. These values are especially applicable for the polypropylene (PP) being a propylene homopolymer (H-PP).

It is appreciated that the polypropylene (PP) and/or the biaxially oriented polypropylene (BOPP) film is further characterized by its crystalline fractions obtained by the stepwise isothermal segregation technique (SIST). Different to known polypropylenes, the instant polypropylene (PP) preferably contains a rather high amount of crystalline fractions at temperatures of above 150° C. Accordingly, it is preferred that the polypropylene (PP) comprises more than 84.0 wt.-% of crystalline fractions crystallizing at temperatures of above 150° C., wherein said fractions are determined by stepwise isothermal segregation technique (SIST). For example, the polypropylene (PP) preferably comprises more than 85.0 wt.-%, more preferably more than 86.0 wt.-% and most preferably more than 86.5 wt.-% of crystalline fractions crystallizing at temperatures of above 150° C., wherein said fractions are determined by stepwise isothermal segregation technique (SIST). In one embodiment of the present invention, the polypropylene (PP) comprises from 84.0 to 98.0 wt.-%, more preferably from 85.0 to 96.0 wt.-%, still more preferably from 86.0 to 94.0 wt.-% and most preferably from 86.5 to 92.0 wt.-% of crystalline fractions crystallizing at temperatures of above 150° C., wherein said fractions are determined by stepwise isothermal segregation technique (SIST).

Further it is preferred that the polypropylene (PP) comprises more than 63.0 wt.-% of crystalline fractions crystallizing at temperatures of above 160° C., wherein said fractions are determined by stepwise isothermal segregation technique (SIST). For example, the polypropylene (PP) preferably comprises more than 64.0 wt.-%, more preferably more than 65.0 wt.-% of crystalline fractions crystallizing at temperatures of above 160° C., wherein said fractions are determined by stepwise isothermal segregation technique (SIST). In one embodiment of the present invention, the polypropylene (PP) comprises from 63.0 to 71.0 wt.-%, more preferably from 64.0 to 70.5 wt.-%, still more preferably from 65.0 to 70.0 wt.-% of crystalline fractions crystallizing at temperatures of above 160° C., wherein said fractions are determined by stepwise isothermal segregation technique (SIST).

It is thus preferred that the inventive polypropylene (PP) contains a rather high amount of crystalline fractions in the temperature range of above 150 to 180° C.

Accordingly, it is preferred that the polypropylene (PP) comprises at least 15.0 wt.-%, more preferably of at least 16.0 wt.-%, like in the range of from 16.0 to below 22.0 wt.-%, still more preferably of at least 17.0 wt.-%, like in the range of from 17.0 to below 21.5 wt.-%, yet more preferably of at least 18.0 wt.-%, like in the range of from 18.0 to 21.0 wt.-%, of a crystalline fraction crystallizing in the temperature range of above 150 to 160° C., wherein said fraction is determined by stepwise isothermal segregation technique (SIST).

Additionally or alternatively, the polypropylene (PP) preferably comprises not more than 37.0 wt.-%, like in the range of from 29.0 to 37.0 wt.-%, more preferably of not more than 36.5 wt.-%, like in the range of from 30.0 to 36.5 wt.-%, still more preferably of not more than 36.0 wt.-%, like in the range of 31.0 to 36.0 wt.-%, of a crystalline fraction crystallizing in the temperature range of above 160 to 170° C., wherein said fraction is determined by stepwise isothermal segregation technique (SIST).

Additionally or alternatively, the polypropylene (PP) preferably comprises at least 25.0 wt.-%, like in the range of from 25.0 to 39.0 wt.-%, more preferably of at least 28.0 wt.-%, like in the range of from 28.0 to 38.0 wt.-%, still more preferably of at least 30.0 wt.-%, like in the range of from 30.0 to 38.5 wt.-%, yet more preferably of at least 32.0 wt.-%, like in the range of from 32.0 to 38.0 wt.-%, of a crystalline fraction crystallizing in the temperature range of above 170 to 180° C., wherein said fraction is determined by stepwise isothermal segregation technique (SIST).

On the other hand, it is appreciated that the polypropylene (PP) comprises crystalline fractions crystallizing in the temperature range of
(i) above 150 to 160° C., and
(ii) above 160 to 170° C.,
wherein the amount of the two crystalline fractions [wt.-%] differs from each other of more than 10.0 wt.-%. For example, the amount of the two crystalline fractions [wt.-%] differs from each other of more than 12.0 wt.-%, like in the range of from 12.0 to 20.0 wt.-%, and preferably of more than 14.0 wt.-%, like in the range of from 14.0 to 18.0 wt.-%, wherein said fractions are determined by stepwise isothermal segregation technique (SIST).

It is further preferred that the amount of the crystalline fraction crystallizing in the temperature range of above 160 to 170° C. is of at least 10.0 wt.-%, preferably of at least 12.0 wt.-%, like in the range of from 12.0 to 20.0 wt.-%, and more preferably of at least 14.0 wt.-%, like in the range of from 14.0 to 18.0 wt.-%, above the amount of the crystalline fraction crystallizing in the temperature range of above 150 to 160° C.

Additionally or alternatively, the amount of the two crystalline fractions crystallizing in the temperature range of
(i) above 160 to 170° C. and
(ii) above 170 to 180° C.
should not differ too high, i.e. the amount of the two crystalline fractions [wt.-%] should not differ from each other of more than 7.0 wt.-%. For example, the amount of the two crystalline fractions [wt.-%] differs from each other of not more than 6.0 wt.-%, like in the range of from 0.1 to 7.0 wt.-%, preferably of not more than 5.0 wt.-%, like in the range of from 0.5 to 5.0 wt.-%, wherein said fractions are determined by stepwise isothermal segregation technique (SIST).

It is thus preferred that the amount of the crystalline fraction crystallizing in the temperature range of above 160 to 170° C. is of about equal to the amount of the crystalline fraction crystallizing in the temperature range of above 170 to 180° C. For example, the amount of the crystalline fraction crystallizing in the temperature range of above 160 to 170° C. is in the range of from 0.1 to 7.0 wt.-%, and preferably in the range of from 0.5 to 5.0 wt.-% above or below the amount of the crystalline fraction crystallizing in the temperature range of above 170 to 180° C.

Thus, it is appreciated that the amount of crystalline fractions crystallizing in the temperature range of below 150° C. is rather low, i.e. of not more than 16.0 wt.-%, preferably of not more than 15.0 wt.-%, more preferably of not more than 14.0 wt.-%, and most preferably of not more than 13.0 wt.-%. For example, the amount of crystalline fractions crystallizing in the temperature range of below 150° C. is in the range of 10.0 to 16.0 wt.-%, preferably in the range of 10.0 to 15.0 wt.-%, more preferably in the range of 10.0 to 14.0 wt.-%, and most preferably in the range of 10.0 to 13.0 wt.-%, wherein said fractions are determined by stepwise isothermal segregation technique (SIST).

Additionally or alternatively, the amount of crystalline fractions crystallizing in the temperature range of below 120° C. is of not more than 1.0 wt.-%, preferably of not more than 0.9 wt.-%, and more preferably of not more than 0.8 wt.-%. For example, the amount of crystalline fractions crystallizing in the temperature range of below 120° C. is in the range of 0.1 to 1.0 wt.-%, preferably in the range of 0.2 to 0.9 wt.-% and more preferably in the range of 0.3 to 0.8 wt.-%, wherein said fractions are determined by stepwise isothermal segregation technique (SIST).

Additionally or alternatively, the amount of crystalline fractions crystallizing above 180° C. is also rather low, i.e. of not more than 1.0 wt.-%, preferably of not more than 0.8 wt.-%, more preferably of not more than 0.5 wt.-% and most preferably of not more than 0.3 wt.-%, wherein said fractions are determined by stepwise isothermal segregation technique (SIST).

It is appreciated that the polypropylene (PP) is featured by a low ash content, in particular by a low ash content without any purification during its preparation, i.e. washing step. Accordingly, the polypropylene (PP) has an ash content of below 45 ppm, i.e. in the range of 10 to below 45 ppm, preferably of below 40 ppm, i.e. 15 to below 40 ppm, more preferably in the range of 20 to 38 ppm. The same values apply for the biaxially oriented polypropylene (BOPP) comprising the polypropylene (PP).

The polypropylene (PP) is subjected to a film forming process. Any film forming processes which are suitable for the preparation of a biaxially oriented polypropylene (BOPP) film can be used.

Accordingly, another aspect of the present invention is directed to a process for the preparation of a biaxially oriented polypropylene (BOPP) film, the process comprising at least the steps of
(a) providing the polypropylene (PP) as defined above,
(b) stretching the polypropylene of step (a) in machine direction and transverse direction.

In a preferred embodiment the polypropylene (PP) is not subjected to a washing step prior to the film forming process.

The biaxially oriented polypropylene (BOPP) film can be prepared by conventional drawing/stretching processes known in the art. Accordingly, the process for the preparation of the biaxially oriented polypropylene (BOPP) film according to this invention comprises the use of the polypropylene (PP) as defined herein and its forming into a film preferably by the tenter method known in the art.

The tenter method is in particular a method in which the polypropylene (PP), especially the propylene homopolymer (H-PP), as defined herein is melt extruded from a slit die such as a T-die and cooled on a cooling drum obtaining an undrawn sheet. Said sheet is pre-heated for example with a heated metal roll and then stretched/drawn in the length direction between a plurality of rolls over which a difference in peripheral speeds is established and then both edges are gripped with grippers and the sheet is stretched/drawn in the transverse direction in an oven by means of a tenter resulting in a biaxially stretched/drawn film. The temperature of said stretched/drawn sheet during the longitudinal stretching/drawing is preferably controlled in such a way as to be within the temperature range of the melting point of the polypropylene (PP) as defined herein. Accordingly it is preferred that the drawing temperature ($T_{draw}$) in both directions fulfils the inequation (I), more preferably the inequation (Ia), yet more preferably the inequation (Ib), still more preferably the inequation (Ic), still yet more preferably the equation (Id), $$Tm-5 \leq Tdraw \leq Tm+5 \quad (I)$$

$$Tm-5 \leq Tdraw \leq Tm+3 \quad (Ia)$$

$$Tm-5 \leq Tdraw \leq Tm \quad (Ib)$$

$$Tm-3 \leq Tdraw \leq Tm-1 \quad (Ic)$$

$$Tm-1 = Tdraw \quad (Id)$$

wherein
Tdraw is the drawing temperature ($T_{draw}$) in ° C.,
Tm is the melting temperature ($T_m$) of the polypropylene (PP) in ° C.

More preferably the drawing temperature ($T_{draw}$) in machine direction fulfils the inequation (I), more preferably the inequation (Ia), yet more preferably the inequation (Ib), still more preferably the inequation (Ic), still yet more preferably the equation (Id), whereas the drawing temperature ($T_{draw}$) in transverse direction fulfils the inequation (II), more preferably the inequation (IIa), yet more preferably the inequation (IIb), still more preferably the inequation (IIc), still yet more preferably the equation (IId), $$Tm-4 \leq Tdraw \leq Tm+4 \quad \text{(II)}$$

$$Tm-4 \leq Tdraw \leq Tm+1 \quad \text{(IIa)}$$

$$Tm-4 \leq Tdraw \leq Tm \quad \text{(IIb)}$$

$$Tm-2 \leq Tdraw \leq Tm \quad \text{(IIc)}$$

$$Tm-1 = Tdraw \quad \text{(IId)}$$

wherein
Tdraw is the drawing temperature ($T_{draw}$) in ° C.,
Tm is the melting temperature ($T_m$) of the polypropylene (PP) in ° C.

Preferably, the biaxially oriented polypropylene (BOPP) film has a draw ratio in machine direction of at least 4.0, preferably of at least 5.0, and a draw ratio in transverse direction of at least 4.0 times, preferably of at least 5.0 times, more preferably of at least 8.0 times, like of at least 9.0 times. Such ratios are appreciated as commercial biaxially oriented polypropylene films must be stretchable at least to the above defined extent without breaking. The length of the sample increases during stretching in longitudinal direction and the draw ratio in longitudinal direction calculates from the ratio of current length over original sample length. Subsequently, the sample is stretched in transverse direction where the width of the sample is increasing. Hence, the draw ratio calculates from the current width of the sample over the original width of the sample. Preferably, the draw ratio in machine direction of the biaxially oriented polypropylene (BOPP) film ranges from 4.0 to 6.0, more preferably from 5.0 to 6.0. The draw ratio in transverse direction of the biaxially oriented polypropylene (BOPP) film ranges preferably from 8.0 to 10.0, more preferably from 9.0 to 10.0.

In one embodiment of the present invention, the biaxially oriented polypropylene (BOPP) film is prepared at a yield force in machine direction of ≤20 N. For example, the biaxially oriented polypropylene (BOPP) film is produced at a yield force in machine direction of ≤15 N, like of ≤12 N. Preferably, the yield force is determined at drawing temperature ($T_{draw}$) being 1° C. lower than the melting temperature ($T_m$) of the unstretched polypropylene (PP) [$T_{dram}=T_m-1$].

Preferably, the biaxially oriented polypropylene (BOPP) film of the present invention has a tensile modulus of at least 2,400 MPa at a draw ratio of 5 in machine direction and a draw ratio of 5 in transverse direction. More preferably, the biaxially oriented polypropylene (BOPP) film has a tensile modulus of at least 2,600 MPa, even more preferably 2,850 MPa, and most preferably at least 2,900 MPa at a draw ratio of 5 in machine direction and a draw ratio of 5 in transverse direction.

The thickness of the biaxially oriented polypropylene (BOPP) film can be up to 50.0 μm, however, typically the biaxially oriented polypropylene (BOPP) film has a thickness of not more than 40.0 μm, preferably not more than 30.0 μm, more preferably not more than 25.0 μm, yet more preferably in the range of 1 to 50.0 μm, like in the range of 2.5 to 25.0 μm.

In view of the very good results obtained for the biaxially oriented polypropylene (BOPP) film, a further aspect of the present invention refers to the use of a polypropylene (PP) as defined herein for the preparation of a biaxially oriented polypropylene (BOPP) film.

Subsequently, the biaxially oriented polypropylene (BOPP) film can be treated by corona discharge in air, nitrogen, carbon dioxide gas or any of the mixtures on the surface to be metalized, to improve the adhesive strength to the metal to be deposited, and wound by a winder.

For instance the obtained biaxially oriented polypropylene (BOPP) film can set in a vacuum metallizer. Then, the metal suitable for the purpose concerned is deposited to achieve a predetermined layer resistance. Furthermore, as required, metallization is carried out through a comb-shaped deposition preventive plate to continuously change the resistance value in the transverse direction of the film. The metalized film preferably is slit, to make two metalized reels as a pair for making a capacitor device. Then, the reels are wound to form a device and the device is formed to be flat by a thermal press to make finally a capacitor.

Accordingly it is preferred that the biaxially oriented polypropylene (BOPP) film is used as a capacitor film. In such as case the biaxially oriented polypropylene (BOPP) film has been preferably metalized, like mentioned above.

According to another aspect of the present invention, an article is provided, characterized in that the article comprises the biaxially oriented polypropylene (BOPP) film as defined above. For example, the article is a capacitor.

The instant polypropylene (PP), like the propylene homopolymer (H-PP) or the random propylene copolymer (C-PP), may be produced in a sequential polymerization process.

The term "sequential polymerization process" indicates that the polypropylene is produced in at least two, like two or three, reactors connected in series. Accordingly the present process comprises at least a first polymerization reactor (R1), a second polymerization reactor (R2), and optionally a third polymerization reactor (R3). The term "polymerization reactor" shall indicate that the main polymerization takes place. Thus in case the process consists of two or three polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According, to the present invention the slurry reactor (SR) is preferably a (bulk) loop reactor (LR). Accordingly, the average concentration of polypropylene (PP), i.e. the first fraction ($1^{st}$ F) of the polypropylene (PP), in the polymer slurry within the loop reactor (LR) is typically from 15 wt.-% to 55 wt.-%, based on the total weight of the polymer slurry within the loop reactor (LR). In one embodiment of the present invention, the average concentration of polypropylene (PP) i.e. of the first fraction ($1^{st}$ F) of the polypropylene (PP) in the polymer slurry within the loop reactor (LR) is from 20 wt.-% to 55 wt.-% and more preferably from 25 wt.-% to 52 wt.-%, based on the total weight of the polymer slurry within the loop reactor (LR).

Preferably, the polypropylene (PP), i.e. the first fraction ($1^{st}$ F) of the polypropylene (PP), of the first reactor (R1), more preferably polymer slurry of the loop reactor (LR) containing the first fraction ($1^{st}$ F) of the polypropylene (PP), is directly fed into the second reactor (R2), i.e. into the first gas phase reactor (GPR-1), without a flash step between the stages. This kind of direct feed is described in EP 887379 A, EP 887380 A, EP 887381 A and EP 991684 A. By "direct feed" is meant a process wherein the content of the first reactor (R1), i.e. of the loop reactor (LR), the polymer slurry comprising the first fraction (1st F) of the polypropylene (PP), is led directly to the next stage gas phase reactor.

Alternatively, the polypropylene (PP), i.e. the first fraction (1st F) of the polypropylene (PP), of the first reactor (R1), more preferably polymer slurry of the loop reactor (LR) containing the first fraction (1st F) of the polypropylene (PP), may be also directed into a flash step or through a further concentration step before fed into the second reactor (R2), i.e. into the first gas phase reactor (GPR-1). Accordingly, this "indirect feed" refers to a process wherein the content of the first reactor (R1), of the loop reactor (LR), i.e. the polymer slurry, is fed into the second reactor (R2), into the first gas phase reactor (GPR-1), via a reaction medium separation unit and the reaction medium as a gas from the separation unit.

A gas phase reactor (GPR) according to this invention is preferably a fluidized bed reactor, a fast fluidized bed reactor or a settled bed reactor or any combination thereof.

More specifically, the second reactor (R2), optionally the third reactor (R3) and any subsequent reactor are preferably gas phase reactors (GPRs). Such gas phase reactors (GPR) can be any mechanically mixed or fluid bed reactors. Preferably, the gas phase reactors (GPRs) comprise a mechanically agitated fluid bed reactor with gas velocities of at least 0.2 msec. Thus, it is appreciated that the gas phase reactor is a fluidized bed type reactor preferably with a mechanical stirrer.

Thus, in a preferred embodiment the first reactor (R1) is a slurry reactor (SR), like loop reactor (LR), whereas the second reactor (R2) and any optional subsequent reactor, like the third reactor (R3), are gas phase reactors (GPR). Accordingly for the instant process at least two, preferably two or three, polymerization reactors, namely a slurry reactor (SR), like loop reactor (LR), a first gas phase reactor (GPR-1), and optionally a second gas phase reactor (GPR-2) connected in series are used. If needed prior to the slurry reactor (SR) a pre-polymerization reactor is placed.

A Ziegler-Natta catalyst (ZN-C), as defined below, is fed into the first reactor (R1) and is transferred with the polymer (slurry) obtained in the first reactor (R1) into the subsequent reactors. If the process covers also a pre-polymerization step it is preferred that the Ziegler-Natta catalyst (ZN-C) is fed in the pre-polymerization reactor. Subsequently the pre-polymerization product containing the Ziegler-Natta catalyst (ZN-C) is transferred into the first reactor (R1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Especially good results are achieved in case the temperature in the reactors is carefully chosen. Accordingly it is preferred that the temperature in at least one of the two or three reactors, preferably at least in the first reactor (R1), i.e. in the loop reactor (LR), is in the range of 70 to 100° C., preferably in the range of 70 to 90° C., more preferably in the range of 72 to 90° C. In one preferred embodiment in all (two or three) reactors the temperature is in the range of 70 to 100° C., preferably in the range of 70 to 90° C., more preferably in the range of 72 to 90° C. In one specific embodiment the temperature in all (two or three) reactors is essentially the same, i.e. differ not more than 2° C. from each other and further the temperature in all three reactors is in the range of 70 to 100° C., preferably in the range of 70 to 90° C., more preferably in the range of 72 to 90° C. C.

Typically, the pressure in the first reactor (R1), preferably in the loop reactor (LR), is in the range of from 20 to 80 bar, preferably 30 to 60 bar, whereas the pressure in the second reactor (R2), i.e. in the first gas phase reactor (GPR-1), and in the optional third reactor (R3), i.e. in the optional second gas phase reactor (GPR-2), and in any subsequent reactor is in the range of from 5 to 50 bar, preferably 15 to 35 bar.

Hydrogen is added in each reactor in order to control the molecular weight, i.e. the melt flow rate $MFR_2$.

Preferably the weight-ratio of co-catalyst (Co) to propylene (C3) [Co/C3], especially when considering the propylene feed into the pre polymerization and loop reactors is in the range of 25 g/t to 40 g/t, more preferably in the range of 28 g/t to 38 g/t, yet more preferably in the range of 29 g/t to 35 g/t.

Preferably the weight-ratio of external donor (ED) to propylene (C3) [ED/C3], especially when considering the total propylene feed into the pre polymerization and loop reactors is in the range of 2.8 g/t to 4.8 g/t, more preferably in the range of 3.0 g/t to 4.6 g/t, yet more preferably in the range of 3.3 g/t to 4.3 g/t.

The residence time can vary in the reactors identified above. In one embodiment, the residence time in the first reactor (R1), for example in the loop reactor (LR), is in the range of from 0.5 to 5 hours, for example 0.5 to 3 hours, while the residence time in the subsequent reactors i.e. in the gas phase reactors, generally will be from 0.5 to 5 hours.

Accordingly, the process for the preparation of the polypropylene (PP) comprises the following steps under the conditions set out above (a) in the first polymerization reactor (R1), i.e. in a loop reactor (LR), propylene and optionally at least one other α-olefin, like optionally a $C_2$ to $C_{10}$ α-olefin other than propylene, is/are polymerized obtaining a first fraction (1st F) of the polypropylene (PP), (b) transferring said first fraction (1st F) to second polymerization reactor (R2), (c) in the second polymerization reactor (R2) propylene and optionally at least one other α-olefin, like optionally a $C_2$ to $C_{10}$ α-olefin other than propylene, is/are polymerized in the presence of the first fraction (1st F) obtaining a second fraction (2nd F) of the polypropylene (PP), said first fraction (1st F) and said second fraction (2nd F) form the polypropylene (PP) or a first mixture (1st M), in case of the first mixture (1st M)

(d) transferring said first mixture (1st M) to third polymerization reactor (R3), and (e) in the third polymerization reactor (R3) propylene and optionally at least one other α-olefin, like optionally a $C_2$ to $C_{10}$ α-olefin other than propylene, is/are polymerized in the presence of the first mixture (1st M) obtaining a third fraction (3rd F) of the polypropylene (PP), said first mixture (1st M) and said third fraction (3rd F) form the polypropylene (PP).

It is to been noted that in case the polypropylene (PP) is a propylene homopolymer (H-PP) also its fractions are propylene homopolymer fractions. In such a case the individual fractions may differ in the melt flow rate $MFR_2$, but not necessarily. Accordingly, in one embodiment the polypropylene (PP) is a propylene homopolymer (H-PP), wherein each fraction has a similar melt flow rate $MFR_2$, i.e. differ not more than +/−0.5 g/10 min, more preferably differ not more than +/−0.3 g/10 min, from each other.

In case the polypropylene (PP) is a random propylene copolymer (C-PP) at least one of the three fractions is a random propylene copolymer fraction. Accordingly, a random propylene copolymer (C-PP) may also comprise a propylene homopolymer fraction. However, it is preferred that the random propylene copolymer (C-PP) consists of random propylene copolymer fractions only.

After step (c) (in the event the polypropylene (PP)) is produced in two reactors) or after step (e) the polypropylene (PP) is preferably discharged without any washing step. Accordingly, in one preferred embodiment the polypropylene (PP) is not subjected to a washing step. In other words in a specific embodiment the polypropylene (PP) is not subjected to a washing step and thus is used unwashed in application forming process.

As pointed out above in the specific process for the preparation of the polypropylene (PP) as defined above a Ziegler-Natta catalyst (ZN-C) is used. This means, the polypropylene (PP) is preferably produced in the presence of a Ziegler-Natta catalyst (ZN-C) as defined below. Still more preferred the polypropylene (PP) is produced in a process as defined above and in the presence of a Ziegler-Natta catalyst (ZN-C) as defined in the instant invention. Accordingly, the Ziegler-Natta catalyst (ZN-C) will be now described in more detail.

Accordingly, the Ziegler-Natta catalyst (ZN-C) must comprise (a) a pro-catalyst (PC) comprising
  (a1) a compound of a transition metal (TM),
  (a2) a compound of a metal (M) which metal is selected from one of the groups 1 to 3 of the periodic table (IUPAC), and
  (a3) an internal electron donor (ID),
(b) a co-catalyst (Co), and
(c) an external donor (ED).

The metal of the compound of a transition metal (TM) is preferably selected from one of the groups 4 to 6, in particular of group 4, like titanium (Ti), of the periodic table (IUPAC). Accordingly the compound of the transition metal (TM) is preferably selected from the group consisting of titanium compound having an oxidation degree of 3 or 4, vanadium compound, chromium compound, zirconium compound, hafnium compound and rare earth metal compounds, more preferably selected from the group consisting of titanium compound, zirconium compound and hafnium compound, and most preferably the transition metal is a titanium compound. Moreover the compounds of the transition metal (TM) are in particular transition metal halides, such as transition metal chlorides. The titanium trichloride and titanium tetrachloride are particularly preferred. Especially preferred is titanium tetrachloride.

According to this invention the term "compound of transition metal" and the term "transition metal compound" are synonyms.

The compound of metal (M) is a compound which metal is selected from one of the groups 1 to 3 of the periodic table (IUPAC), preferably from the Group 2 metal. Usually the compound of metal (M) is titaniumless. Especially the compound of metal (M) is a magnesium compound, like $MgCl_2$.

Moreover as stated above the pro-catalyst (PC) must comprise an internal electron donor (ID), which is chemically different to the external donor (ED) of the Ziegler-Natta catalyst (ZN-C), i.e. the internal donor (ID) preferably comprises, still more preferably is, a dialkylphthalate of formula (II)

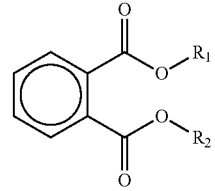

(II)

wherein $R_1$ and $R_2$ can be independently selected from a $C_1$ to $C_4$ alkyl, preferably $R_1$ and $R_2$ are the same, i.e. define the same $C_1$ to $C_4$ alkyl residue.

Preferably, the internal donor (ID) comprises, like is, a n-dialkylphthalate of formula (II), wherein $R_1$ and $R_2$ can be independently selected from a $C_1$ to $C_4$ n-alkyl, preferably $R_1$ and $R_2$ are the same, i.e. define the same $C_1$ to $C_4$ n-alkyl residue. Still more preferably the internal donor (ID) comprises, like is, n-dialkylphthalate of formula (II), wherein $R_1$ and $R_2$ can be independently selected from a $C_1$ and $C_2$ alkyl, preferably $R_1$ and $R_2$ are the same, i.e. define the same $C_1$ or $C_2$ alkyl residue. Still more preferably the internal donor (ID) comprises, like is, diethylphthalate.

Of course the above defined and further below defined pro-catalyst (PC) is a solid, supported pro-catalyst composition.

Moreover, it is preferred that the pro-catalyst (PC) contains not more than 2.5 wt.-% of the transition metal (TM), preferably titanium. Still more preferably the pro-catalyst contains 1.7 to 2.5 wt.-% of the transition metal (TM), preferably titanium. Additionally it is appreciated that the molar ratio of internal donor (ID) to metal (M), like Mg, of the pro-catalyst [ID/M] is between 0.03 and 0.08, still more preferably between 0.04 and 0.06, and/or its internal donor (ID) content is between 4 and 15 wt.-%, still more preferably between 6 and 12 wt.-%.

Furthermore, it is preferred that the internal donor (ID) is the result of a transesterification of a dialkylphthalate of formula (I) with an alcohol. It is in particular preferred that the pro-catalyst (PC) is a pro-catalyst (PC) as produced in the patent applications WO 87/07620, WO 92/19653, WO 92/19658 and EP 0 491 566. The content of these documents is herein included by reference.

The metal of the compound of a transition metal (TM) is preferably selected from one of the groups 4 to 6, in particular of group 4, like titanium (Ti), of the periodic table (IUPAC). Accordingly it is preferred that the pro-catalyst (PC) is prepared by bringing together (a) a compound of a transition metal (TM), preferably a transition metal (TM) compound selected from one of the groups 4 to 6, more preferably a transition metal (TM) compound of group 4, like titanium (Ti) compound, of the periodic table (IUPAC), in particular a titanium halide, like $TiCl_3$ or $TiCl_4$, the latter especially preferred, (b) a compound of a metal (M) which metal is selected from one of the groups 1 to 3 of the periodic table (IUPAC), preferably a compound of magnesium, like $MgCl_2$, (c) a $C_1$ to $C_4$ alcohol, preferably a $C_1$ to $C_2$ alcohol, like methanol or ethanol, most preferably ethanol and (d) a dialkylphthalate of formula (I),

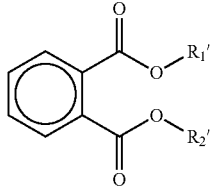

(I)

wherein $R_1'$ and $R_2'$ have more carbon atoms as said alcohol, preferably are independently at least a $C_5$ alkyl, like at least a $C_8$ alkyl, more preferably $R_1'$ and $R_2'$ are the same and are at least a $C_5$ alkyl, like at least a $C_8$ alkyl, or preferably a n-dialkylphthalate of formula (I) wherein $R_1'$ and $R_2'$ have more carbon atoms as said alcohol, preferably are independently at least a $C_5$ n-alkyl, like at least a $C_8$ n-alkyl, more preferably $R_1'$ and $R_2'$ are the same and are at least a $C_5$ n-alkyl, like at least a $C_8$ n-alkyl or more preferably dioctylphthalate, like di-iso-octylphthalate or diethylhexylphthalate, yet more preferably diethylhexylphthalate, wherein a transeterification between said alcohol and said dialkylphthalate of formula (I) has been carried out under suitable transesterification conditions, i.e. at a temperature between 130 to 150° C.

Among others the preferred dialkylphthalate of formula (I) for the above and further down described process for the manufacture of the pro-catalyst (PC) is selected from the group consisting of propylhexylphthalate (PrHP), dioctylphthalate (DOP), di-iso-decylphthalate (DIDP), diundecylphthalate, diethylhexylphthalate and ditridecylphthalate (DTDP). The most preferred dialkylphthalate is dioctylphthalate (DOP), like di-iso-octylphthalate or diethylhexylphthalate, in particular diethylhexylphthalate.

Preferably at least 80 wt.-%, more preferably at least 90 wt.-%, of the dialkylphthalate of formula (I) is transesterified to the dialkylphthalate of formula (II) as defined above.

It is particular preferred that the pro-catalyst (PC) is prepared by (a) contacting a spray crystallized or solidified adduct of the formula $MgCl_2*nEtOH$, wherein n is 1 to 6, with $TiCl_4$ to form a titanised carrier, (b) adding to said titanised carrier (i) a dialkylphthalate of formula (I) with $R_1'$ and $R_2'$ being independently at least a $C_5$ alkyl, like at least a $C_8$ alkyl, or preferably (ii) a dialkylphthalate of formula (I) with $R_1'$ and $R_2'$ being the same and being at least a $C_5$ alkyl, like at least a $C_8$ alkyl or more preferably (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is dioctylphthalate (DOP), like di-iso-octylphthalate or diethylhexylphthalate, in particular diethylhexylphthalate, to form a first product (c) subjecting said first product to suitable transesterification conditions, i.e. at a temperature between 130 to 150° C. such that said ethanol is transesterified with said ester groups of said dialkylphthalate of formula (I) to form preferably at least 80 mol-%, more preferably 90 mol-%, most preferably 95 mol.-%, of a dialkylphthalate of formula (II) with $R_1$ and $R_2$ being —$CH_2CH_3$, and (d) recovering said transesterification product as the pro-catalyst (PC).

As a further requirement the Ziegler-Natta catalyst (ZN-C) must comprise a co-catalyst (Co). Preferably the co-catalyst (Co) is a compound of group 13 of the periodic table (IUPAC), e.g. organo aluminum, such as an aluminum compound, like aluminum alkyl, aluminum halide or aluminum alkyl halide compound. Accordingly in one specific embodiment the co-catalyst (Co) is a trialkylaluminum, like triethylaluminium (TEA), dialkyl aluminium chloride or alkyl aluminium sesquichloride. In one specific embodiment the co-catalyst (Co) is triethylaluminium (TEA).

Additionally, the Ziegler-Natta catalyst (ZN-C) must comprise an external donor (ED). Preferably the external donor (ED) is a hydrocarbyloxy silane derivative. Accordingly in one specific embodiment the external donor (ED) is represented by formula (IIIa) or (IIIb).

Formula (IIIa) is defined by $$Si(OCH_3)_2R_2^5 \tag{IIIa}$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \tag{IIIb}$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor (ED) is selected from the group consisting of diethylaminotriethoxysilane [$Si(OCH_2CH_3)_3(N(CH_2CH_3)_2)$] (U-donor), dicyclopentyl dimethoxy silane [$Si(OCH_3)_2(cyclo-pentyl)_2$] (D-donor), diisopropyl dimethoxy silane [$Si(OCH_3)_2(CH(CH_3)_2)_2$] (P-donor) and mixtures thereof. Most preferably the external donor is dicyclopentyl dimethoxy silane [$Si(OCH_3)_2(cyclo-pentyl)_2$] (D-donor).

Accordingly, especially good results are achieved with a Ziegler-Natta catalyst (ZN-C) comprising (a) a pro-catalyst (PC) comprising titanium, $MgCl_2$, and internal donor (ID), wherein said internal donor (ID) comprises, preferably is,
 (i) a dialkylphthalate of formula (II),

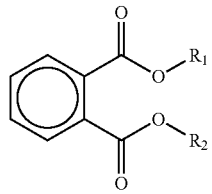

wherein $R_1$ and $R_2$ are independently selected from a $C_1$ to $C_4$ alkyl, preferably $R_1$ and $R_2$ are the same, i.e. define the same $C_1$ to $C_4$ alkyl residue,
 or preferably
 (ii) a n-dialkylphthalate of formula (II), wherein $R_1$ and $R_2$ can be independently selected from a $C_1$ to $C_4$ n-alkyl, preferably $R_1$ and $R_2$ are the same, i.e. define the same $C_1$ to $C_4$ n-alkyl residue,
 or more preferably
 (iii) a n-dialkylphthalate of formula (II), wherein $R_1$ and $R_2$ can be independently selected from a $C_1$ and $C_2$ alkyl, preferably $R_1$ and $R_2$ are the same, i.e. have the same $C_1$ or $C_2$ alkyl residue,
 or still more preferably
 (iv) diethylphthalate,
(b) a cocatalyst (Co) being trialkylaluminum, dialkyl aluminium chloride or alkyl aluminium sesquichloride, preferably triethylaluminium (TEA), and
(c) an external donor (ED) being selected from the group consisting of diethylaminotriethoxysilane $[Si(OCH_2CH_3)_3(N(CH_2CH_3)_2)]$, dicyclopentyl dimethoxy silane $[Si(OCH_3)_2(cyclo\text{-}pentyl)_2]$ (D-donor), diisopropyl dimethoxy silane $[Si(OCH_3)_2(CH(CH_3)_2)_2]$ (P-donor) and mixtures thereof, more preferably being dicyclopentyl dimethoxy silane $[Si(OCH_3)_2(cyclo\text{-}pentyl)_2]$.

More preferably said pro-catalyst (PC) has been produced as defined above and also described in the patent applications WO 92/19658, WO 92/19653 and EP 0 491 566 A2. The co-catalyst (Co) as well as the external donor (ED) are added to the pro-catalyst (PC) prior to polymerization of the polypropylene (PP) or are fed all together to the first reactor (R1) or—if used—to the pre-polymerization reactor.

Important aspect of the present invention is that the ratio between on the one hand of co-catalyst (Co) and the external donor (ED) [Co/ED] and on the other hand of the co-catalyst (Co) and the transition metal (TM) [Co/TM] have been carefully chosen.

Accordingly,
(a) the mol-ratio of co-catalyst (Co) to external donor (ED) [Co/ED] must be in the range of above 10 to below 40, and
(b) the mol-ratio of co-catalyst (Co) to transition metal (TM) [Co/TM] must be in the range of above 40 to below 160.

In the following the present invention is further illustrated by means of examples.

EXAMPLES

A. Measuring Methods

The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the stereo-regularity (tacticity), regio-regularity and comonomer content of the polymers. Quantitative $^{13}C$ $\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For polypropylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromoleucles 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra For ethylene-propylene copolymers approximately 200 mg of material was dissolved in 3 ml of 1,2-tetrachloroethane-$d_2$ (TCE-$d_2$) along with chromium-(III)-acetylacetonate $(Cr(acac)_3)$ resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6 k) transients were acquired per spectra.

Quantitative $^{13}C$ $\{^1H\}$ NMR spectra were processed, integrated and relevant quantitative properties determined from the integrals using proprietary computer programs.

For ethylene-propylene copolymers all chemical shifts were indirectly referenced to the central methylene group of the ethylene block (EEE) at 30.00 ppm using the chemical shift of the solvent. This approach allowed comparable referencing even when this structural unit was not present.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W.-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

$[mmmm]\% = 100*(mmmm/\text{sum of all pentads})$

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$P_{21e} = (I_{e6} + I_{e8})/2$

The amount of 1,2 primary inserted propene was quantified based on the methyl region with correction undertaken for sites included in this region not related to primary insertion and for primary insertion sites excluded from this region:

$P_{12} = I_{CH3} + P_{12e}$

The total amount of propene was quantified as the sum of primary inserted propene and all other present regio defects:

$P_{total} = P_{12} + P_{21e}$

The mole percent of 2,1 erythro regio defects was quantified with respect to all propene:

$[21e] \text{mol}\% = 100*(P_{21e}/P_{total})$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The mole fraction of ethylene in the polymer was quantified using the method of Wang et. al. (Wang, W-J., Zhu, S., Macromolecules 33 (2000), 1157) through integration of multiple signals across the whole spectral region of a $^{13}C$ $\{^1H\}$ spectra acquired using defined conditions. This method was chosen for its accuracy, robust nature and ability to account for the presence of regio-defects when needed. Integral regions were slightly adjusted to increase applicability to a wider range of comonomer contents.

The mole percent comonomer incorporation in the polymer was calculated from the mole fraction according to:

$E[\text{mol}\%] = 100*fE$

The weight percent comonomer incorporation in the polymer was calculated from the mole fraction according to:

$E[\text{wt}\%] = 100*(fE*28.05)/((fE*28.05) + ((1-fE)*42.08))$

The comonomer sequence distribution at the triad level was determined using the method of Kakugo et al. (Kakugo, M., Naito, Y., Mizunuma, K., Miyatake, T. Macromolecules 15 (1982) 1150) through integration of multiple signals across the whole spectral region of a $^{13}C$ $\{^1H\}$ spectra acquired using defined conditions. This method was chosen for its robust nature. Integral regions were slightly adjusted to increase applicability to a wider range of comonomer contents.

The mole percent of a given comonomer triad sequence in the polymer was calculated from the mole fraction determined by the method of Kakugo et at. (Kakugo, M., Naito, Y., Mizunuma, K., Miyatake, T. Macromolecules 15 (1982) 1150) according to:

$XXX[\text{mol}\%] = 100*fXXX$

The mole fraction comonomer incorporation in the polymer, as determined from the comonomer sequence distribution at the triad level, were calculated from the triad distribution using known necessary relationships (Randall, J. Macromol. Sci., Rev. Macromol. Chem. Phys. 1989, C29, 201):

$fXEX = fEEE + fPEE + fPEP$ $fXPX = fPPP + fEPP + fEPE$ where PEE and EPP represents the sum of the reversible sequences PEE/EEP and EPP/PPE respectively.

The randomness of the comonomer distribution was quantified as the relative amount of isolated ethylene sequences as compared to all incorporated ethylene. The randomness was calculated from the triad sequence distribution using the relationship:

$R(E)[\%] = 100*(fPEP/fXEX)$

Rheology: Dynamic rheological measurements were carried out with Rheometrics RDA-II QC on compression moulded samples under nitrogen atmosphere at 200° C. using 25 mm-diameter plate and plate geometry. The oscillatory shear experiments were done within the linear viscoelastic range of strain at frequencies from 0.01 to 500 rad/s. (ISO 6721-10) The values of storage modulus (G'), loss modulus (G"), complex modulus (G*) and complex viscosity ($\eta^*$) were obtained as a function of frequency ($\omega$).

The Zero shear viscosity ($\eta_0$) was calculated using complex fluidity defined as the reciprocal of complex viscosity. Its real and imaginary part are thus defined by $f'(\omega) = \eta'(\omega)/[\eta'(\omega)^2 + \eta''(\omega)^2]$ and $f''(\omega) = \eta''(\omega)/[\eta'(\omega)^2 + \eta''(\omega)^2]$ From the following equations $\eta' = G''/\omega$ and $\eta'' = G'/\omega$ $f'(\omega) = G''(\omega)*\omega/[G'(\omega)^2 + G''(\omega)^2]$ $f''(\omega) = G'(\omega)*\omega/[G'(\omega)^2 + G''(\omega)^2]$ The Polydispersity Index, PI, $PI = 10^5/G_c$, is calculated from the cross-over point of $G'(\omega)$ and $G''(\omega)$, for which $G'(\omega_c) = G''(\omega_c) = G_c$ holds.

Melt Flow Rate (MFR$_2$)

The melt flow rates were measured with a load of 2.16 kg (MFR$_2$) at 230° C. The melt flow rate is that quantity of polymer in grams which the test apparatus standardized to ISO 1133 extrudes within 10 minutes at a temperature of 230° C. under a load of 2.16 kg.

The ash content is measured according to ISO 3451-1 (1997).

The xylene solubles (XCS, wt.-%): Content of xylene cold solubles (XCS) is determined at 25° C. according ISO 16152; first edition; 2005-07-01.

Melting temperature $T_m$, crystallization temperature $T_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

WAXS (Wide Angle X-Ray Scattering) Measurement:

To measure wide-angle X-ray scattering (WAXS) of the samples a Bruker D8 Discover was used. The diffractometer was equipped with an X-ray tube with a copper target operating at 30 kV and 20 mA and a GADDS 2-D detector. To direct the beam onto the surface, a point collimation (0.5 mm) was used. The measurement was done in reflection geometry, and 2θ angle in the range from 10° to 32.5° were measured. Data were collected for 300 s.

Intensity vs. 2-theta curve was acquired with the same measurement parameters on an amorphous polypropylene sample, which was prepared by solvent extraction. An amorphous halo was obtained by smoothing the curve. The amorphous halo has been subtracted from the measured intensity vs. 2-theta curve to result in the crystalline curve.

The crystallinity index Xc (crystallinity) can be defined with the area under the crystalline curve and the original spectrum using Challa, Hermans and Weidinger method [Challa G, Hermans P H, Weidinger A, *Makromol. Chem.* 56, 169 (1962)] as:

$$X_c = \frac{\text{area under crystalline curve}}{\text{area under original spectrum}} \times 100$$

The amount of β-form of the polypropylene within the crystalline phase $K_\beta$ is calculated using Jones method [Turner-Jones A, Aizlewood J M, Beckett D R, *Makromol. Chem.* 75, 134 (1974)] according to the following equation:

$$K_\beta = \frac{I^\beta(300)}{I^\alpha(110) + I^\alpha(040) + I^\alpha(130) + I^\beta(300)}$$

where, $I^\beta(300)$ is the intensity of β(300) peak, $I^\alpha(110)$ is the intensity of α(110) peak, $I^\alpha(040)$ is the intensity of α(040) peak and $I^\alpha(130)$ is the intensity of α(130) peak obtained after subtracting the amorphous halo.

The amount of γ-form of iPP within the crystalline phase Kγ is calculated using the method developed by Pae [Pae K D, *J. Polym. Sci., Part A*, 6, 657 (1968)] as:

$$K_\gamma = \frac{I^\gamma(117)}{I^\alpha(130) + I^\gamma(117)}$$

where, $I^\alpha(130)$ is the intensity of α(130) peak and $I^\gamma(117)$ is the intensity of γ(117) peak obtained after subtracting a base line joining the base of these peaks.

Quantification of three-phase crystalline system has been carried out following the procedure explained in Obadal M, Cermak R, Stoklasa K, *Macromol. Rapid Commun.* 26, 1253 (2005). For three-phase crystalline systems the following equations have been used to determine Kα (amount of α-phase), Kβ (amount of β-phase) and Kγ (amount of γ-phase):

$$K_\beta = \frac{I^\beta(300)}{I^\alpha(110) + I^\alpha(040) + I^\alpha(130) + I^\beta(300) + I^\gamma(117)}$$

$$K_{\alpha+\gamma} = 1 - K_\beta,$$

$$K_\gamma = G \times K_{\alpha+\gamma},$$

and $$K_\alpha = 1 - K_\beta - K_\gamma$$

Stepwise Isothermal Segregation Technique (SIST)

The isothermal crystallisation for SIST analysis was performed in a Mettler TA820 DSC on 3±0.5 mg samples at decreasing temperatures between 200° C. and 105° C.

(i) the samples were melted at 225° C. for 5 min.,
(ii) then cooled with 80° C./min to 145° C.
(iii) held for 2 hours at 145° C.,
(iv) then cooled with 80° C./min to 135° C.
(v) held for 2 hours at 135° C.,
(vi) then cooled with 80° C./min to 125° C.
(vii) held for 2 hours at 125° C.,
(viii) then cooled with 80° C./min to 115° C.
(ix) held for 2 hours at 115° C.,
(x) then cooled with 80° C./min to 105° C.
(xi) held for 2 hours at 105° C.

After the last step the sample was cooled down with 80° C./min to −10° C. and the melting curve was obtained by heating the cooled sample at a heating rate of 10° C./min up to 200° C. All measurements were performed in a nitrogen atmosphere. The melt enthalpy is recorded as function of temperature and evaluated through measuring the melt enthalpy of fractions melting within temperature intervals of 50 to 60° C.; 60 to 70° C.; 70 to 80° C.; 80 to 90° C.; 90 to 100° C.; 100 to 110° C.; 110 to 120° C.; 120 to 130° C.; 130 to 140° C.; 140 to 150° C.; 150 to 160° C.; 160 to 170° C.; 170 to 180° C.; 180 to 190° C.; 190 to 200° C.

Compression Moulding

Samples have been prepared according to ISO 173-2, on a frame mould:

TABLE 1

Conditions for compression moulding of test specimens

| Preheating | | |
|---|---|---|
| time | [min] | 10 |
| temperature | [° C.] | from 25 to 200 |
| Pressure build up | | |
| 1 min at 200° C. | [bar] | 25 |
| 1 min at 200° C. | [bar] | 50 |
| 1 min at 200° C. | [bar] | 75 |
| Moulding | | |
| time | [min] | 3 |
| temperature | [° C.] | 200 |
| pressure | [bar] | 75 |

TABLE 1-continued

Conditions for compression moulding of test specimens

Cooling

| | | |
|---|---|---|
| cooling rate | [° C./min] | 15 |
| temperature | [° C.] | from 200 to 40 |
| Pressure | [bar] | 75 |
| Release | [min] | 5 |
| temperature | [° C.] | 40 |
| time | [min] | after 10 |
| pressure | [bar] | 0 |

Biaxially Oriented Polypropylene (BOPP) Film

The samples were simultaneously and equibiaxially drawn on a Karo IV Labscale BOPP stretcher (by Brückner Maschinenbau),

| | |
|---|---|
| Undrawn specimen size | 8.5 × 8.5 cm, 500-600 μm |
| Drawing mode | simultaneous, biaxial |
| Pre-heating of specimem | 120 seconds at $T_{draw}$ |
| Draw ratio λ, (Hencky strain) ε') | 5 × 5, (ε' = 1.6) |
| Strain rate ε' | 870%/s, $\dot{\epsilon}$ = 2.16 s$^{-1}$ |
| Relaxation | 2%, (5 × 5 → 4.9 × 4.9) |
| Final BOPP film size | 41.65 × 41.65 cm, ~20 μm thickness |

Evaluation of Yield Forces

Force-strain curves were recorded automatically during drawing. The first peak of the force-strain curve was identified as the yield point. Only the recorded MD forces have been used to read out the yield force.

Tensile modulus in machine direction was determined according to ISO 527-3 at 23° C. on the biaxially oriented films. Testing was performed at a cross head speed of 1 mm/min.

The tensile modulus; tensile Stress; are measured at 23° C. according to ISO 527-1 (cross head speed 1 mm/min) using S2 bars cut from the compression moulded specimens.

Shrinkage of the BOPP film was measured in analogy to ISO 11501—"Determination of dimensional change on heating". Film specimens sized 5×10 cm were cut from the BOPP film and placed in an oven in air, for 30 min at 120° C. The relative decrease in length of the so treated film compared to the original film is reported as percent shrinkage.

Residual Crystallinity $f_{RC}$

The residual crystallinity $f_{RC}$ is derived from a first heat scan of a differential scanning calorimetry (DSC) measurement which is performed on compression moulded sample as defined above. The residual crystallinity $f_{RC}$ is defined by the formula $$f_{RC} = 1 - f_{RM},$$

wherein
$f_{RC}$ is the residual crystallinity, and
$f_{RM}$ is the molten fraction.

The molten fraction $f_{RM}$ is a running integral, normalized by the melting enthalpy $\Delta H_m$, as reported in the following formula $$\text{Molten fraction, } MF(T) = \frac{\int_{90° C.}^{T} HeatFlow(T) dT}{\Delta H_m}$$

The total melting enthalpy $\Delta H_m$ is calculated as the integral of the DSC thermogram upon melting, in the range from 90° C. to $T_m$+20° C., wherein $T_m$ refers to the melting temperature of the compression moulded polypropylene. For example, the integral at the numerator of the equation calculated at 150° C. would be the area from 90 to 150° C. under the melting peak, and the molten fraction f at 150° C. would be the ratio of this area to the overall area under the melting peak, i.e. from 90° C. to $T_m$+20° C. The residual crystallinity $f_{RC}$ (at 150° C.) thus corresponds to the ratio of area starting from 150 to $T_m$+20° C. to the overall area under the melting peak. Different $f_{RC}$ calculations at selected temperatures (150° C., 155° C., 160° C. etc.) can be carried out.

B. Examples

Example IE1 was accomplished on a 21.3 L autoclave equipped with control valves for dosing the reactor with monomers, hydrogen and for flashing. The dosage of monomers and hydrogen into the reactor was monitored by flow controllers and also by monitoring the mass of their respective reservoirs. The temperature of the reactors was controlled via cooling/heating of water in the double jacket around the reactors including sensors in both the top and bottom of the reactor. Helical stirrers with magnetic coupling were used for effective mixing inside the reactor and the stirring rates could be varied during the course of the reaction. The entire process was programmed ahead of time, executed and monitored by work station computers outside of the reactor cabins.

General Polymerisation Conditions:

The catalyst used in the polymerization process for the polypropylene of the inventive example (IE1) has been produced as follows: First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethyl-aluminium (TEAL) and as donor dicyclo pentyl dimethoxy silane (D-donor) were used. The aluminium to donor ratio is indicated in table 1.

Bulk:

The reactor is initially purged with propylene and then filled with 5250 g of propylene and 6 litres of Hydrogen for the pre-polymerisation. The catalyst was mixed with a solution of TEAL and D donor at different ratios (see table 1) for 5 minutes before being added to the reactor. The catalyst loading vessel is then flushed with 250 g propylene to ensure all of the catalyst mixture is added to the reactor. The reactor then undergoes prepolymerisation at 23° C. for 6 minutes while stirring at 350 rpm. Subsequently, the reactor is heated up to temperatures between 75 and 85° C. to initiate bulk conditions. While in transition the desired amount of hydrogen is added to the reactor via a flow controller. Hydrogen is always added in bulk and not added continuously during the reaction. Once the desired reactor conditioners are reached, the reactor is held at a constant pressure by dosing with propylene. This transition time to reach the bulk conditions was typically ~19 minutes. After the specified bulk residence time, the reactor is purged to 0.5 bar with a stirring speed of 100 rpm to continue to a gas phase step.

GPR 1

Once the desired purge pressure (0.5 bar) was achieved, the transition to the final gas phase (GPR 1) began. The stirring rate of the reactor was increased to 350 rpm and the reactor was dosed with propylene and hydrogen as the temperature and pressure were increased to 75-85° C. and 22 bar, respectively. The transition time between loop and GPR1 was typically between 8 to 10 minutes. Once the reactor reached the desired temperature, the pressure was held constant at 22 bar by dosing with propylene. The amount of polymer being produced could be monitored by measuring the amount of propylene added during the course of the reaction. After the gas phase reaction was run for 3 hours, the reactor followed the termination procedure outlined below.

Reaction Termination:

After the reaction is completed the stirring speed is reduced to 100 rpm and the gas mixture purged from the reactor to 0 bar. Residual gases are removed from the reactor (as well as the polymer particles) by treating the reactor with several vacuum cycles. This cycle involves put the reactor under vacuum for several minutes, filling up to ambient pressures with nitrogen and then repeating the process several times. The product is then safely removed from the reactor.

TABLE 1

Preparation of example IE1

| | | Examples IE1 |
|---|---|---|
| Ti in cat | [wt.-%] | 1.8 |
| TEAL/Ti | [mol/mol] | 40-160 |
| TEAL/Donor | [mol/mol] | 10-40 |
| cat. Amount | [mg] | 28-31 |
| Reactor Temp. | [° C.] | 75-85 |
| Bulk | | |
| split | [wt.-%] | 31-48 |
| MFR$_2$ | [g/10'] | 2.3-2.6 |
| H2/C3 | [mol/kmol] | 2.1-2.5 |
| 1 GPR | | |
| Split | [wt.-%] | 52-68 |
| MFR$_2$ | [g/10'] | 2-4 |
| H2/C3 | [mol/kmol] | 18.70 |
| Yield | [kg] | 0.8-2.2 |
| Activity | [kg/(g * h)] | 8-25 |
| Productivity | [kg/g] | 28-86 |

TABLE 2

Properties

| | | Examples | |
|---|---|---|---|
| | Unit | CE1 | IE1 |
| MFR$_2$ | [g/10 min] | 3.4 | 2.79 |
| XS | [wt %] | 2.0 | 2.24 |
| mmmm | [%] | 96.3 | 96.4 |
| T$_m$ | [° C.] | 163.6 | 165.6 |
| T$_c$ | [° C.] | 113.7 | 120.7 |
| PI | [Pas$^{-1}$] | 5 | 3.83 |
| Cryst. | [%] | 64 | 65.2 |
| T$_m$, plate | [° C.] | 162.6 | 165.6 |

TABLE 2-continued

Properties

| | | Examples | |
|---|---|---|---|
| | Unit | CE1 | IE1 |
| e-mod | [MPa] | 2308 | 2400 |
| Yield stress plate | [MPa] | 43 | 44 |
| f$_{RC}$ at ΔT = 1° C.* | [MPa] | 0.43 | 0.36 |
| Yield force, BOPP, ΔT = 1° C.** | [N] | 24 | 10 |

*measured at 1° C. below the melting temperature T$_m$ of the compression moulde sample
**measured at the preparation of a BOPP film with a drawing temperature being 1° C. below the melting temperature T$_m$ of the compression moulde sample
Crys crystallinity
As comparative example CE1 a commercial propylene homopolymer has been used with the properties innidcated below.

TABLE 3

SIST of the examples

| Range [° C.] | CE1 [wt.-%] | IE1 [wt.-%] |
|---|---|---|
| 50-60 | 0.00 | 0.0 |
| 60-70 | 0.05 | 0.0 |
| 70-80 | 0.15 | 0.0 |
| 80-90 | 0.28 | 0.0 |
| 90-100 | 0.43 | 0.1 |
| 100-110 | 0.59 | 0.2 |
| 110-120 | 0.93 | 0.5 |
| 120-130 | 1.60 | 1.2 |
| 130-140 | 3.10 | 2.3 |
| 140-150 | 9.71 | 7.6 |
| 150-160 | 22.62 | 19.3 |
| 160-170 | 37.68 | 35.3 |
| 170-180 | 22.69 | 33.2 |
| >180 | 0.08 | 0.3 |

The properties of the unstretched samples prepared from the polypropylenes of the inventive and comparative examples are summarized in Table 2 and 3.

The f$_{RC}$ of the inventive example (IE1) is 0.36 while the f$_{RC}$ for the comparative example (CE1) is 0.43—a difference of about 16%. This clearly affects the force required for stretching the film at this temperature difference. In particular, it can be gathered that the force required for the IE1 is 10 N, while the force required for the CE1 is more than twice as high, i.e. 24 N.

The properties of the biaxially oriented polypropylene (BOPP) films prepared from the polypropylenes of the inventive and comparative examples are summarized in Table 4.

TABLE 4

Biaxially oriented polypropylene (BOPP) films

| Catalyst | Cy | TM | SH | C | TM | SH |
|---|---|---|---|---|---|---|
| | T$_{draw}$ = T$_m$ − 4° C. | | | T$_{draw}$ = T$_m$ − 1° C. | | |
| IE | 65.4 | 3071 | 2.0 | 62.4 | 3025 | 1.3 4 |
| | T$_{draw}$ = T$_m$ − 6° C. | | | T$_{draw}$ = T$_m$ − 1° C. | | |
| CE | 55.5 | 2599 | 3.7 | 61.5 | 2872 | 2.2 |

SH shrinkage

As can be gathered from the measured details outlined in Table 4, the inventive BOPP film has favourable film properties compared to prior art biaxially oriented polypropylene films at the measured temperatures. In particular, it can be gathered that the comparative BOPP film shows good film properties with regard to shrinkage, crystallinity and stiffness.

The invention claimed is:

1. Biaxially oriented polypropylene (BOPP) film comprising: a polypropylene (PP) having a residual crystallinity $f_{RC}$ of ≤0.4 at a temperature (T) being 1° C. below the melting temperature ($T_m$) of the polypropylene (PP) [$T=T_m-1$].

2. Biaxially oriented polypropylene (BOPP) film according to claim 1, wherein the polypropylene (PP) has a residual crystallinity $f_{RC}$ of ≤0.3 at the melting temperature ($T_m$) of the polypropylene (PP).

3. Biaxially oriented polypropylene (BOPP) film according to claim 1, wherein the biaxially oriented polypropylene (BOPP) film comprises a polypropylene (PP) comprising:
   (a) crystalline fractions crystallizing in the temperature range of
      (i) 150 to 160° C., and
      (ii) 160 to 170° C.,
   wherein the amount of the two crystalline fractions [wt. %] differs from each other of more than 10.0 wt. %, wherein further said fractions are determined by the stepwise isothermal segregation technique (SIST), and/or
   (b) crystalline fractions crystallizing in the temperature range of
      (i) 160 to 170 ° C., and
      (ii) 170 to 180 ° C.,
   wherein the amount of the two crystalline fractions [wt. %] differs from each other of not more than 7.0 wt. %, wherein further said fractions are determined by the stepwise isothermal segregation technique (SIST), and/or
   (c) crystalline fractions crystallizing above 160° C. of more than 63.0 wt. %, wherein said fractions are determined by the stepwise isothermal segregation technique (SIST).

4. Biaxially oriented polypropylene (BOPP) film according to claim 1, wherein the biaxially oriented polypropylene (BOPP) film comprises a polypropylene (PP) comprising:
   (a) crystalline fractions crystallizing in the temperature range of below 120° C. in an amount of not more than 1.0 wt. %, wherein said fractions are determined by the stepwise isothermal segregation technique (SIST), and/or
   (b) crystalline fractions crystallizing in the temperature range of below 150° C. in an amount of not more than 16.0 wt. %, wherein said fractions are determined by the stepwise isothermal segregation technique (SIST), and/or
   (c) crystalline fractions crystallizing above 180° C. in an amount of not more than 1.0 wt. %, wherein said fractions are determined by the stepwise isothermal segregation technique (SIST).

5. Biaxially oriented polypropylene (BOPP) film according to claim 1, wherein the biaxially oriented polypropylene (BOPP) film comprises a polypropylene (PP) having:
   (a) a melting temperature ($T_m$) measured by differential scanning calorimetry (DSC) of at least 160 ° C., and/or
   (b) a crystallization temperature ($T_c$) measured by differential scanning calorimetry (DSC) of at least 115° C.

6. Biaxially oriented polypropylene (BOPP) film according to claim 1, wherein the biaxially oriented polypropylene (BOPP) film comprises a polypropylene (PP) having:
   (a) a melt flow rate $MFR_2$ (230° C.) measured according to ISO 1133 of≤7.0 g/10 min, and/or
   (b) a xylene cold soluble fraction (XCS) determined at 23° C. according ISO 6427 of≥2.0 wt. %, and/or
   (c) an mmmm pentad concentration of≥95.0% determined by NMR-spectroscopy, and/or
   (d) 2,1-erythro reciodefects of below 1.0% determined by $^{13}$C-NMR spectroscopy.

7. Biaxially oriented polypropylene (BOPP) film according to claim 1, wherein the biaxially oriented polypropylene (BOPP) film comprises a polypropylene (PP) being a propylene homopolymer (H-PP).

8. Biaxially oriented polypropylene (BOPP) film according to claim 1, wherein the biaxially oriented polypropylene (BOPP) film has been prepared at a yield force in machine direction of≤20 N.

9. Process for the preparation of a biaxially oriented polypropylene (BOPP) film, the process comprising at least the steps of:
   (a) providing a polypropylene (PP) as defined in claim 1, and
   (b) stretching the polypropylene of step a) in machine direction and transverse direction.

10. Biaxially oriented polypropylene (BOPP) film according to claim 1, wherein the polypropylene (PP) has:
   (a) a crystallinity of>61.5 wt. %, and
   (b) a shrinkage of<2.2%,
   when drawn at a draw ratio in machine direction and transverse direction of 5.0 and as drawing temperature (Tdraw) being 1° C. below the melting temperature ($T_m$) of the polypropylene (PP) [$T_{draw}=T_m-1$].

11. Biaxially oriented polypropylene (BOPP) film comprising: a polypropylene (PP), said polypropylene (PP) has:
   (a) a crystallinity of>61.5 wt. %, and
   (b) a shrinkage of<2.2%,
   when drawn at a draw ratio in machine direction and transverse direction of 5.0 and as drawing temperature (Tdraw) being 1° C. below the melting temperature ($T_m$) of the polypropylene (PP) [$T_{draw}=T_m-1$].

* * * * *

UNITED STATES PATENT AND TRADEMARK OFFICE
CERTIFICATE OF CORRECTION

PATENT NO. : 9,487,634 B2
APPLICATION NO. : 14/440844
DATED : November 8, 2016
INVENTOR(S) : Wolfgang Neissl et al.

Page 1 of 1

It is certified that error appears in the above-identified patent and that said Letters Patent is hereby corrected as shown below:

In the Claims

Column 30, Line 19 reads "erythro reciodefects" should read --erythro regiodefects--

Signed and Sealed this
Twenty-third Day of May, 2017

Michelle K. Lee
*Director of the United States Patent and Trademark Office*